US012411918B2

(12) United States Patent
Dravneek et al.

(10) Patent No.: US 12,411,918 B2
(45) Date of Patent: Sep. 9, 2025

(54) PERFORMING SECURE DATA INTERACTIONS IN A VIRTUAL ENVIRONMENT

(71) Applicant: Bank of America Corporation, Charlotte, NC (US)

(72) Inventors: Victoria Lynn Dravneek, Charlotte, NC (US); Manu Jacob Kurian, Dallas, TX (US); Ana Maxim, Arlington, VA (US)

(73) Assignee: Bank of America Corporation, Charlotte, NC (US)

( * ) Notice: Subject to any disclaimer, the term of this patent is extended or adjusted under 35 U.S.C. 154(b) by 292 days.

(21) Appl. No.: 18/057,984

(22) Filed: Nov. 22, 2022

(65) Prior Publication Data

US 2024/0169037 A1    May 23, 2024

(51) Int. Cl.
 *G06F 21/31* (2013.01)
 *G06F 3/04815* (2022.01)
 *G06T 13/40* (2011.01)
 *H04L 67/306* (2022.01)

(52) U.S. Cl.
 CPC .......... *G06F 21/31* (2013.01); *G06F 3/04815* (2013.01); *G06T 13/40* (2013.01); *H04L 67/306* (2013.01)

(58) Field of Classification Search
 CPC ..... G06F 21/31; G06F 3/04815; G06T 13/40; H04L 67/306
 See application file for complete search history.

(56) References Cited

U.S. PATENT DOCUMENTS

| | | |
|---|---|---|
| 6,347,993 B1 * | 2/2002 | Kondo ................ A63F 13/95 |
| | | 434/167 |
| 8,082,297 B2 | 12/2011 | Syvain et al. |
| 8,631,417 B1 | 1/2014 | Mendes Da Costa et al. |
| 8,676,659 B1 * | 3/2014 | Shnowske ............ G06Q 30/00 |
| | | 705/26.1 |
| 9,165,426 B2 | 10/2015 | Jones et al. |
| 9,203,860 B1 * | 12/2015 | Casillas ............. H04L 63/1441 |
| 9,342,211 B2 | 5/2016 | Deluca et al. |
| 9,355,110 B1 * | 5/2016 | Chi .................... G02B 27/0172 |
| 10,326,667 B2 | 6/2019 | Jones et al. |
| 10,587,584 B2 | 3/2020 | Vikramaratne et al. |
| 10,610,787 B2 | 4/2020 | Hamilton et al. |
| 10,931,650 B1 | 2/2021 | Mccown et al. |
| 10,981,069 B2 | 4/2021 | Kawachiya et al. |

(Continued)

OTHER PUBLICATIONS

NPL Search History (Year: 2024).*

*Primary Examiner* — John B King (57) ABSTRACT

A system includes a memory and a processor coupled to the memory. The processor receives a user credential associated with a user and authorizes an avatar of the user to enter a virtual environment. The processor monitors a plurality of data interactions associated with the first user that are performed in the virtual environment, records information relating to a set of parameters that correspond to a first user profile associated with the first user and determines a first confidence indicator for the first user relating to the first user profile. The processor receives a request from a second user for the first confidence indicator, obtains the first confidence indicator and transmits the obtained first confidence indictor to a user device of the second user.

20 Claims, 3 Drawing Sheets

(56) References Cited

U.S. PATENT DOCUMENTS

| | | | |
|---|---|---|---|
| 11,170,003 B2 | 11/2021 | Wu et al. | |
| 11,212,362 B2* | 12/2021 | Dhara | H04L 67/306 |
| 11,468,446 B2* | 10/2022 | Li | G06F 17/16 |
| 2007/0254631 A1 | 11/2007 | Spooner | |
| 2008/0270292 A1* | 10/2008 | Ghosh | G06Q 40/02 |
| | | | 705/38 |
| 2008/0279416 A1* | 11/2008 | Lo | G06V 40/1365 |
| | | | 382/100 |
| 2010/0250383 A1 | 9/2010 | Frazier et al. | |
| 2011/0072367 A1 | 3/2011 | Bauer | |
| 2011/0126272 A1* | 5/2011 | Betzler | G06F 21/41 |
| | | | 726/6 |
| 2012/0185916 A1* | 7/2012 | Chae | G06F 21/316 |
| | | | 726/2 |
| 2013/0041713 A1* | 2/2013 | Henrich | G06Q 10/0635 |
| | | | 705/7.28 |
| 2014/0026078 A1 | 1/2014 | Dawson et al. | |
| 2015/0052453 A1* | 2/2015 | Yu | H04L 67/535 |
| | | | 715/753 |
| 2015/0088717 A1* | 3/2015 | Votaw | G06Q 50/01 |
| | | | 705/35 |
| 2015/0199645 A1* | 7/2015 | Sulur | G06Q 10/10 |
| | | | 705/342 |
| 2015/0310204 A1* | 10/2015 | Pruthi | G06F 21/41 |
| | | | 726/25 |
| 2015/0339494 A1* | 11/2015 | Young | G06F 21/6263 |
| | | | 726/28 |
| 2016/0350859 A1* | 12/2016 | Dintenfass | G06Q 40/06 |
| 2016/0358170 A1* | 12/2016 | Kurian | G06Q 20/385 |
| 2016/0358258 A1* | 12/2016 | Dintenfass | G06Q 40/06 |
| 2017/0235848 A1* | 8/2017 | Van Dusen | G06Q 10/101 |
| | | | 705/12 |
| 2018/0104595 A1 | 4/2018 | Kawachiya et al. | |
| 2018/0123816 A1 | 5/2018 | Tandon et al. | |
| 2018/0307303 A1* | 10/2018 | Powderly | G06F 3/017 |
| 2018/0337908 A1* | 11/2018 | Rappaport | G06F 21/30 |
| 2018/0342070 A1* | 11/2018 | Chen | G06V 20/52 |
| 2019/0027141 A1* | 1/2019 | Strong | G10L 15/1815 |
| 2019/0289025 A1* | 9/2019 | Kursun | G06F 16/285 |
| 2019/0327237 A1* | 10/2019 | Bar | G06F 21/316 |
| 2019/0370551 A1* | 12/2019 | Mao | G06V 20/52 |
| 2020/0068031 A1* | 2/2020 | Kursun | H04W 24/02 |
| 2020/0098155 A1* | 3/2020 | Chou | G06T 13/40 |
| 2020/0169483 A1* | 5/2020 | Kursun | G06Q 20/3678 |
| 2020/0338458 A1 | 10/2020 | Huang et al. | |
| 2021/0012112 A1* | 1/2021 | Ulbricht | G06V 20/10 |
| 2021/0042748 A1 | 2/2021 | Sepulveda et al. | |
| 2021/0406541 A1* | 12/2021 | Ulbricht | G06V 30/274 |
| 2022/0335221 A1* | 10/2022 | Baumgartner | G06Q 40/279 |
| 2023/0092487 A1* | 3/2023 | Kalbasi | H04W 4/00 |
| | | | 455/411 |
| 2023/0410129 A1* | 12/2023 | Varghese | H04L 63/1425 |

\* cited by examiner

PERFORMING SECURE DATA INTERACTIONS IN A VIRTUAL ENVIRONMENT

TECHNICAL FIELD

The present disclosure relates generally to network communication, and more specifically to performing secure data interactions in a virtual environment.

BACKGROUND

In a network environment, user devices are in data communication with other user devices that may be distributed anywhere in the world. These network environments allow data and information to be shared among these devices. Some of the technical challenges that occur when data is exchanged between devices are controlling data leakage, unauthorized access to data, and preventing malicious activities. Data storing user devices, such as computers, laptops, augmented reality devices, virtual reality devices, and smartphones, are vulnerable to attacks. This vulnerability poses several network security challenges. Existing systems are typically unable to detect a malicious attack until after the attack has occurred. For example, a bad actor may pretend to be another user in a virtual environment which then allows the bad actor to gain access to other users' information.

SUMMARY

The system and methods implemented by the system as disclosed in the present disclosure provide technical solutions to the technical problems discussed above by allowing a user to securely access a virtual environment and perform secure data interactions in the virtual environment. The disclosed system and methods provide several practical applications and technical advantages.

For example, the disclosed system and methods provide the practical application of improving interoperability of real-world systems and virtual world systems (e.g., metaverse systems) so that information may be seamlessly shared between these systems to implement data security, authorization of data interactions, and other data interactions performed in real-world and virtual environments. For example, user information collected from the user and/or assigned to the user in a real-world environment may be used in a virtual environment (e.g., metaverse environment) to authenticate the user before allowing the user to access the virtual environment and perform any kind of action or interaction within the virtual environment. This process provides improved information security because it authenticates that an avatar is associated with the user and not an unauthorized party and that the user is authorized to access the virtual environment.

The disclosed system and methods provide an additional practical application of improving information security in the virtual environment and/or real-world environment based on data interactions performed by the users in the virtual environment. As described in embodiments of the present disclosure, a first user of the virtual environment is assigned one or more confidence indicators based on data interactions performed by the first user and/or related to the first user in the virtual environment. A confidence indicator associated with the first user may be indicative of a credibility/reputation of the first user in the virtual environment, wherein a higher confidence indicator indicates a higher credibility/reputation. Data interactions with the first user or relating to the first user in the virtual environment and/or real-world environment may be performed based on one or more confidence indicators of the first user. For example, a data interaction relating to the first user that is to be performed in the virtual environment or the real-world environment may be authorized when a confidence indicator of the first user equals or exceeds a threshold value. Thus, the disclosed system and methods help ensure that only those data interactions that involve users having high credibility/reputation are authorized to occur in the virtual environment.

The disclosed system and methods provide an additional practical application of improving information security in the virtual environment and/or real-world environment by limiting user data that can be accessed by users in the virtual environment. As described in accordance with embodiments of the disclosure, virtual-world server may be configured to provide upon request from a second user or entity one or more confidence indicators associated with one or more respective user profiles of the first user. In one embodiment, virtual-world server may provide to the second user or entity only those confidence indicators the second user or entity is authorized to obtain. For example, virtual-world server may register the second user to obtain confidence indicators of other users (e.g., first user) associated with certain user profiles. In this case, virtual-world server may provide to the second user confidence indicators associated with only those user profiles the second user is registered to receive. The virtual-world server may not provide the second user confidence indicators associated with those user profiles the second user is not registered to receive. This limits users and entities in the virtual environment to obtain only that information about other users which is relevant to their needs. By controlling dissemination of user information, virtual-world server improves data security in the virtual environment.

Thus, the disclosed system and methods improve data security in the virtual environment. By improving data security in virtual environment, the disclosed system and methods generally improve technology related to performing secure data interactions in a virtual environment.

The disclosed system and methods provide the additional practical application of saving memory resources. The seamless data flow between the real-world systems and virtual-world systems as a result of interoperability of these systems allows each system to store less data by avoiding the need to store the same data (e.g., authentication data, login credentials, etc.) in both systems, as data stored in one system can be accessed, or otherwise leveraged, by the other system. This saves memory resources by avoiding duplication of data. The saving of memory resources may leave more system memory for storing other data used in other technical operations. This provides the additional technical advantage of improving processing efficiency of computing systems that manage the real-world and virtual word environments.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Example System

Figure 1:
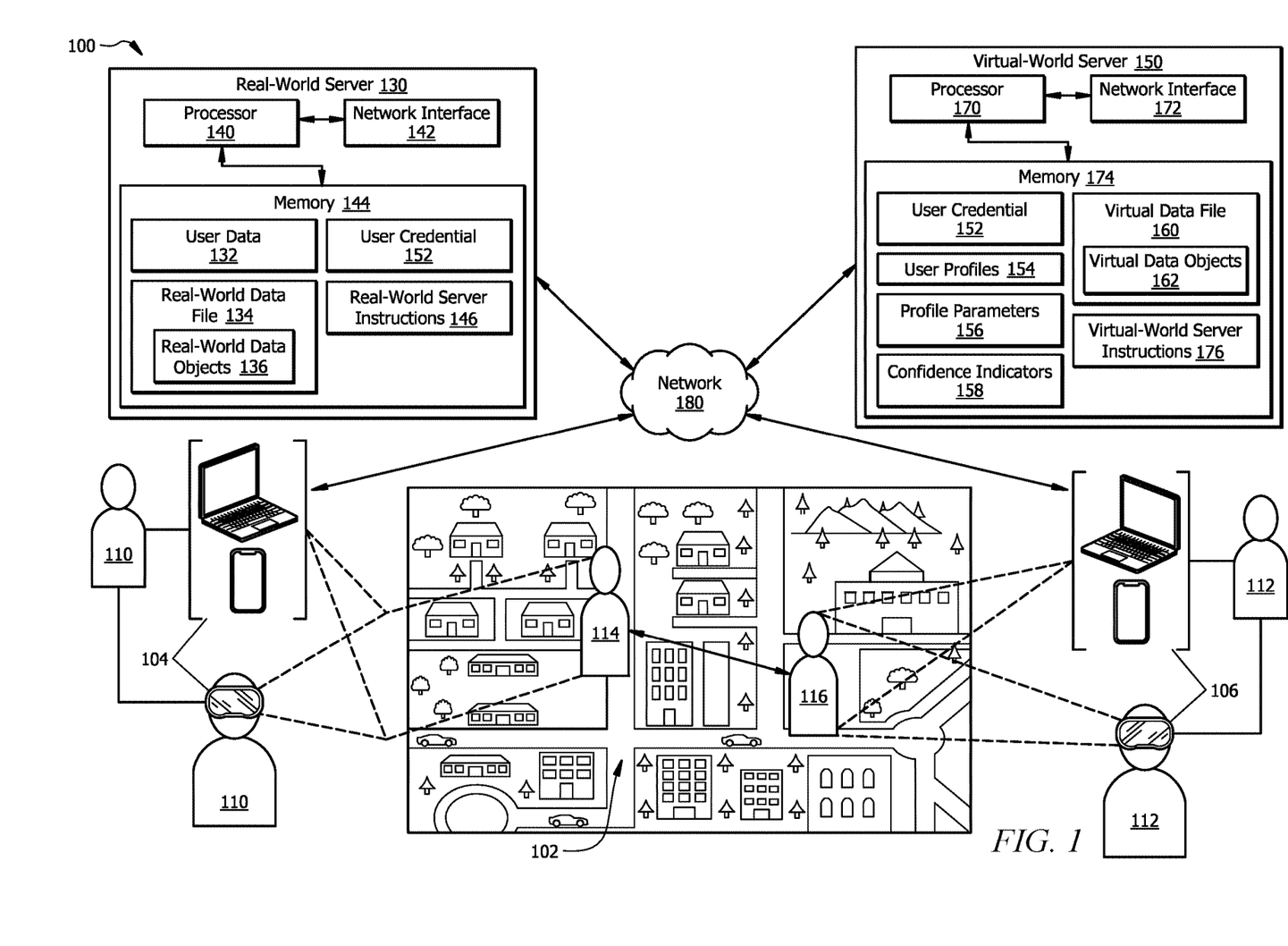
FIG. 1 is a schematic diagram of a system, in accordance with certain aspects of the present disclosure.

FIG. 1 is a schematic diagram of a system 100, in accordance with certain aspects of the present disclosure. System 100 may include a first user device 104, a second user device 106, real-world server 130, and virtual-world server 150, each connected to a network 180. A first user 110 is associated with the first user device 104 and a second user 112 is associated with the second user device 106. The system 100 may be communicatively coupled to the communication network 180 and may be operable to transmit data between each one of the first user device 104, second user device 106, real-world server 130, and virtual-world server 150 through the communication network 180.

In general, the system 100 may improve interoperability of real-world systems and virtual world systems (e.g., metaverse systems) so that information may be seamlessly shared between these systems to implement data security, authorization of data interactions, and other data interactions performed in real-world and virtual environments. For example, user information collected from the user and/or assigned to the user in a real-world environment may be used in a virtual environment 102 (e.g., metaverse environment) to authenticate the first user 110 before allowing the first user 110 to access the virtual environment 102 and perform any kind of action or interaction within the virtual environment 102. This process provides improved information security because it authenticates that a first avatar 114 is associated with the first user 110, not an unauthorized party, and that the first user 110 is authorized to access the virtual environment 102. Additionally or alternatively, system 100 may improve data and network security in the virtual environment 102. As described in embodiments of the present disclosure, a first user 110 of the virtual environment 102 is assigned one or more confidence indicators 158 based on data interactions performed by the first user 110 and/or related to the first user 110 in the virtual environment 102. A confidence indicator 158 associated with the first user 110 may be indicative of a credibility/reputation of the first user 110 in the virtual environment 102, wherein a higher confidence indicator 158 indicates a higher credibility/reputation. Data interactions with the first user 110 or relating to the first user 110 in the virtual environment 102 may be performed based on one or more confidence indicators 158 of the first user 110. For example, a data interaction relating to the first user 110 may be authorized when a confidence indicator 158 of the first user 110 equals or exceeds a threshold value. Thus, system 100 helps ensure that only those data interactions that involve users having high credibility/reputation are authorized to occur in the virtual environment 102.

It may be noted that the terms "real-world" and "real-world environment" in this disclosure refer to any non-virtual environment where users (e.g., users 110 and 112) can physically interact with real persons and objects. A real-world data interaction may refer to any data interaction performed outside the virtual environment 102 (e.g., a metaverse environment). Further, it may be noted that while certain embodiments of the present disclosure may be described in the context of a metaverse environment which is an example of a virtual environment 102, the methods discussed in this disclosure apply to any other virtual environment 102. The terms "virtual environment" and "metaverse environment" are used interchangeably throughout this disclosure. Furthermore, it may be noted that while certain embodiments of this disclosure describe one or more operations in relation to the first user 110, these embodiments apply to any other user (e.g., second user 112) connected to network 180.

The first user 110 may access the virtual environment 102 (e.g., a metaverse environment) through the first user device 104. The first user device 104 is configured to display a two-dimensional (2D) or three-dimensional (3D) representation of the virtual environment 102 to the first user 110. Examples of a virtual environment 102 may include, but are not limited to, a graphical or virtual representation of a metaverse, a map, a building interior, a landscape, a fictional location, an alternate reality, or any other suitable type of location or environment. The virtual environment 102 may be configured to use realistic or non-realistic physics for the motion of objects within the virtual environment 102. For example, some virtual environments 102 may be configured to use gravity whereas other virtual environments 102 be configured not to use gravity. Within the virtual environment 102, each user may be associated with an avatar (such as the first avatar 114 for the first user 110). An avatar is a graphical representation of a user at a virtual location within the virtual environment 102. In embodiments, the virtual location of the avatar may be correlated to the physical location of a user in the real-world environment. Examples of an avatar may include, but are not limited to, a person, an animal, or an object. In some embodiments, the features and characteristics of the avatar may be customizable and user-defined. For example, the size, shape, color, attire, accessories, or any other suitable type of appearance features may be specified by a user. By using an avatar, a user is able to move within the virtual environment 102 to interact with one or more avatars and objects within the virtual environment 102 while independently remaining at a physical location in the real-world environment or being in transit in the real-world environment.

While engaging in the virtual environment 102 via the first avatar 114, the first user 110 may interact with a plurality of other users, objects and/or entities through a respective avatar. For example, the second user 112 may attempt to engage in an interaction session with the first avatar 114 through a second avatar 116 associated with the second user 112. In the real-world environment, the second user 112 may be physically located at a distance away from the first user 110. The second user 112 may access the virtual environment 102 through the second user device 106 to control the second avatar 116 and attempt to engage in an interaction session with the first user 110 through the first avatar 114.

Before the interaction between the first avatar 114 and the second avatar 116 occurs, the virtual-world server 150 may authenticate that the first avatar 114 is associated with the first user 110 and not an unauthorized third-party. For example, the first user 110 may be required to sign into a secure portal that provides access to a data file (e.g., real-world data file 134 and/or virtual data file 160) associated with the first user 110. As shown in FIG. 1, the real-world data file 134 of the first user 110 is stored and managed by the real-world server 130 and the virtual data file 160 of the first user 110 is stored and managed by the virtual-world server 150. In one or more embodiments, the virtual-world server 150 may employ single sign-on (SSO), multifactor authentication, or any other suitable authentication scheme in order to allow the first user 110 access to the virtual data file 160 and/or the real-world data file 134. The virtual data file 160 and the real-world data file 134 may include virtual data objects 162 and real-world data objects 136 respectively owned by the first user 110. The real-world server 130 and the virtual-world server 150 may store other information related to the first user 110 including, but not limited to, user profile information, account information (e.g., including identity and other details relating to the respective data files 134 and 160), avatar information, digital assets (e.g., respective real-world data objects 136 and virtual data objects 162) information, or any other suitable type of information that is associated with a user within the virtual environment 102 and/or the real-world environment.

As shown in FIG. 1, virtual-world server 150 comprises a processor 170, a memory 174, and a network interface 172. The processor 170 comprises one or more processors operably coupled to the memory 174. The processor 170 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 170 may be a programmable logic device, a microcontroller, a microprocessor, or any suitable combination of the preceding. The processor 170 is communicatively coupled to and in signal communication with the memory 174. The one or more processors are configured to process data and may be implemented in hardware or software. For example, the processor 170 may be 8-bit, 16-bit, 32-bit, 64-bit or of any other suitable architecture. The processor 170 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions (e.g., virtual-world server instructions 176) to implement the virtual-world server 150. In this way, processor 170 may be a special-purpose computer designed to implement the functions disclosed herein. In one or more embodiments, the virtual-world server 150 is implemented using logic units, FPGAs, ASICs, DSPs, or any other suitable hardware. The virtual-world server 150 is configured to operate as described with reference to FIGS. 1 and 3. For example, the processor 170 may be configured to perform at least a portion of the method 300 as described in FIG. 3.

The memory 174 comprises one or more disks, tape drives, or solid-state drives, and may be used as an over-flow data storage device, to store programs when such programs are selected for execution, and to store instructions and data that are read during program execution. The memory 174 may be volatile or non-volatile and may comprise a read-only memory (ROM), random-access memory (RAM), ternary content-addressable memory (TCAM), dynamic random-access memory (DRAM), and static random-access memory (SRAM).

The memory 174 is operable to store the user credential 152, user profiles 154, profile parameters 156, confidence indicators 158, virtual data file 160, virtual data objects 162, and the virtual-world server instructions 176. The virtual-world server instructions 176 may include any suitable set of instructions, logic, rules, or code operable to execute the virtual-world server 150.

The network interface 172 is configured to enable wired and/or wireless communications. The network interface 172 is configured to communicate data between the virtual-world server 150 and other devices, systems, or domains (e.g. user devices 104 and 106 and the real-world server 130). For example, the network interface 172 may comprise a Wi-Fi interface, a LAN interface, a WAN interface, a modem, a switch, or a router. The processor 170 is configured to send and receive data using the network interface 172. The network interface 172 may be configured to use any suitable type of communication protocol as would be appreciated by one of ordinary skill in the art.

The real-world server 130 comprises a processor 140, a memory 144, and a network interface 142. The processor 140 comprises one or more processors operably coupled to the memory 144. The processor 140 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 140 may be a programmable logic device, a microcontroller, a microprocessor, or any suitable combination of the preceding. The processor 140 is communicatively coupled to and in signal communication with the memory 144. The one or more processors are configured to process data and may be implemented in hardware or software. For example, the processor 140 may be 8-bit, 16-bit, 32-bit, 64-bit or of any other suitable architecture. The processor 140 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions (e.g., real-world server instructions 146) to implement the real-world server 130. In this way, processor 140 may be a special-purpose computer designed to implement the functions disclosed herein. In one or more embodiments, the real-world server 130 is implemented using logic units, FPGAs, ASICs, DSPs, or any other suitable hardware. The real-world server 130 is configured to operate as described with reference to FIGS. 1 and 3. For example, the processor 140 may be configured to perform at least a portion of the method 300 as described in FIG. 3.

The memory 144 comprises one or more disks, tape drives, or solid-state drives, and may be used as an over-flow data storage device, to store programs when such programs are selected for execution, and to store instructions and data that are read during program execution. The memory 144 may be volatile or non-volatile and may comprise a read-only memory (ROM), random-access memory (RAM), ternary content-addressable memory (TCAM), dynamic random-access memory (DRAM), and static random-access memory (SRAM).

The memory 144 is operable to store information relating to user data 132, real-world data file 134, real-world data objects 136, user credential 152, and the real-world server instructions 146. The real-world server instructions 146 may include any suitable set of instructions, logic, rules, or code operable to execute the real-world server 130.

The network interface 142 is configured to enable wired and/or wireless communications. The network interface 142 is configured to communicate data between the real-world server 130 and other devices, systems, or domains (e.g. user devices 104 and 106 and the virtual-world server 150). For example, the network interface 142 may comprise a Wi-Fi interface, a LAN interface, a WAN interface, a modem, a switch, or a router. The processor 140 is configured to send and receive data using the network interface 142. The network interface 142 may be configured to use any suitable type of communication protocol as would be appreciated by one of ordinary skill in the art.

Each of the real-world server 130 and the virtual-world server 150 is generally a suitable server (e.g., including a physical server and/or virtual server) operable to store data in a memory (e.g., respective memories 144 and 174) and/or provide access to application(s) or other services. One or both of the real-world server 130 and the virtual-world server 150 may be a backend server associated with a particular entity (e.g., organization) that facilitates conducting interactions between entities and one or more users. In other embodiments, one or both of the real-world server 130 and the virtual-world server 150 may be organized in a distributed manner, or by leveraging cloud computing technologies. Real-world server 130 may store information which is primarily used to support data interactions performed in the real-world environment. Virtual-world server 150 may store information which is primarily used to support data interactions performed in the virtual environment 102 (e.g., a metaverse environment). It may be noted that the operations performed by the real-world server 130 and the virtual-world server 150 described in embodiments of the present disclosure may be implemented by a single server.

The communication network 180 may facilitate communication within the system 100. This disclosure contemplates the communication network 180 being any suitable network operable to facilitate communication between the first user device 104, second user device 106, real-world server 130 and the virtual-world server 150. Communication network 180 may include any interconnecting system capable of transmitting audio, video, signals, data, messages, or any combination of the preceding. Communication network 180 may include all or a portion of a local area network (LAN), a wide area network (WAN), an overlay network, a software-defined network (SDN), a virtual private network (VPN), a packet data network (e.g., the Internet), a mobile telephone network (e.g., cellular networks, such as 4G or 5G), a Plain Old Telephone (POT) network, a wireless data network (e.g., WiFi, WiGig, WiMax, etc.), a Long Term Evolution (LTE) network, a Universal Mobile Telecommunications System (UMTS) network, a peer-to-peer (P2P) network, a Bluetooth network, a Near Field Communication network, a Zigbee network, and/or any other suitable network, operable to facilitate communication between the components of system 100. In other embodiments, system 100 may not have all of these components and/or may have other elements instead of, or in addition to, those above.

Each of the user devices (i.e., first user device 104 and second user device 106) may be any computing device configured to communicate with other devices, such as a server (e.g., real-world server 130 and/or virtual-world server 150), databases, etc. through the communication network 180. Each of the user devices may be configured to perform specific functions described herein and interact with one or both of real-world server 130 and the virtual-world server 150, e.g., via respective user interfaces. Each of the user devices is a hardware device that is generally configured to provide hardware and software resources to a user. Examples of a user device include, but are not limited to, a virtual reality device, an augmented reality device, a laptop, a computer, a smartphone, a tablet, a smart device, an Internet-of-Things (IoT) device, or any other suitable type of device. The user devices may comprise a graphical user interface (e.g., a display), a touchscreen, a touchpad, keys, buttons, a mouse, or any other suitable type of hardware that allows a user to view data and/or to provide inputs into the user device. Each user device may be configured to allow a user to send requests to one or both of real-world server 130 and the virtual-world server 150, or to another user device.

Example User Device

Figure 2:
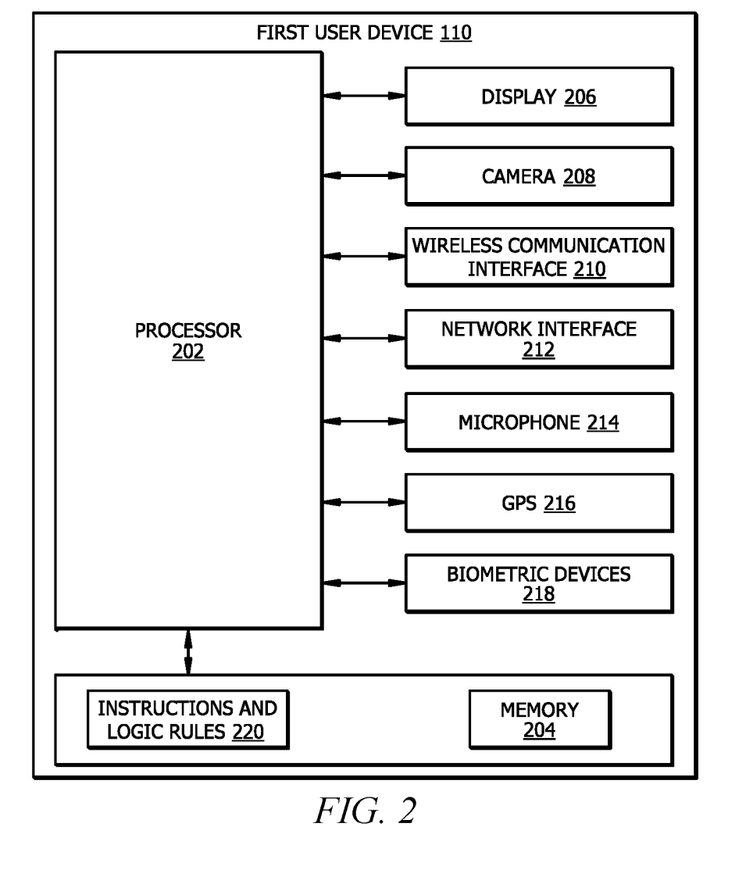
FIG. 2 is a block diagram of an embodiment of the first user device used by the system of FIG. 1.

FIG. 2 is a block diagram of an embodiment of the first user device 104 used by the system of FIG. 1. First user device 104 may be configured to display the virtual environment 102 (referring to FIG. 1) within a field of view of the first user 110 (referring to FIG. 1), capture biometric, sensory, and/or physical information of the first user 110 wearing the first user device 104, and to facilitate an electronic interaction between the first user 110 and the second user 112 (referring to FIG. 1) or between the first user 110 and an entity (e.g., represented by a virtual entity in the virtual environment 102).

First user device 104 comprises a processor 202, a memory 204, and a display 206. Further embodiments may include a camera 208, a wireless communication interface 210, a network interface 212, a microphone 214, a global position system (GPS) sensor 216, and/or one or more biometric devices 218. First user device 104 may be configured as shown or in any other suitable configuration. For example, first user device 104 may comprise one or more additional components and/or one or more shown components may be omitted.

The processor 202 comprises one or more processors operably coupled to and in signal communication with memory 204, display 206, camera 208, wireless communication interface 210, network interface 212, microphone 214, GPS sensor 216, and biometric devices 218. Processor 202 is configured to receive and transmit electrical signals among one or more of memory 204, display 206, camera 208, wireless communication interface 210, network interface 212, microphone 214, GPS sensor 216, and biometric devices 218. The electrical signals are used to send and receive data (e.g., images captured from camera 208, virtual objects to display on display 206, etc.) and/or to control or communicate with other devices. Processor 202 may be operably coupled to one or more other devices (for example, the real-world server 130 and/or virtual-world server 150 shown in FIG. 1).

The processor 202 is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 202 may be a programmable logic device, a microcontroller, a microprocessor, or any suitable combination of the preceding. The one or more processors are configured to process data and may be implemented in hardware or software. For example, the processor 202 may be 8-bit, 16-bit, 32-bit, 64-bit or of any other suitable architecture. The processor 202 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement the function disclosed herein, such as some or all of those described with respect to FIGS. 1 and 3. For example, processor 202 may be configured to display virtual objects on display 206, detect hand gestures, identify virtual objects selected by a detected hand gesture, capture biometric information of a user, such as first user 110, via one or more of camera 208, microphone 214, and/or biometric devices 218, and communicate via wireless communication interface 210 with the real-world server 130, virtual-world server 150 and/or second user device 106. In some embodiments, the function described herein is implemented using logic units, FPGAs, ASICs, DSPs, or any other suitable hardware or electronic circuitry.

Figure 3:
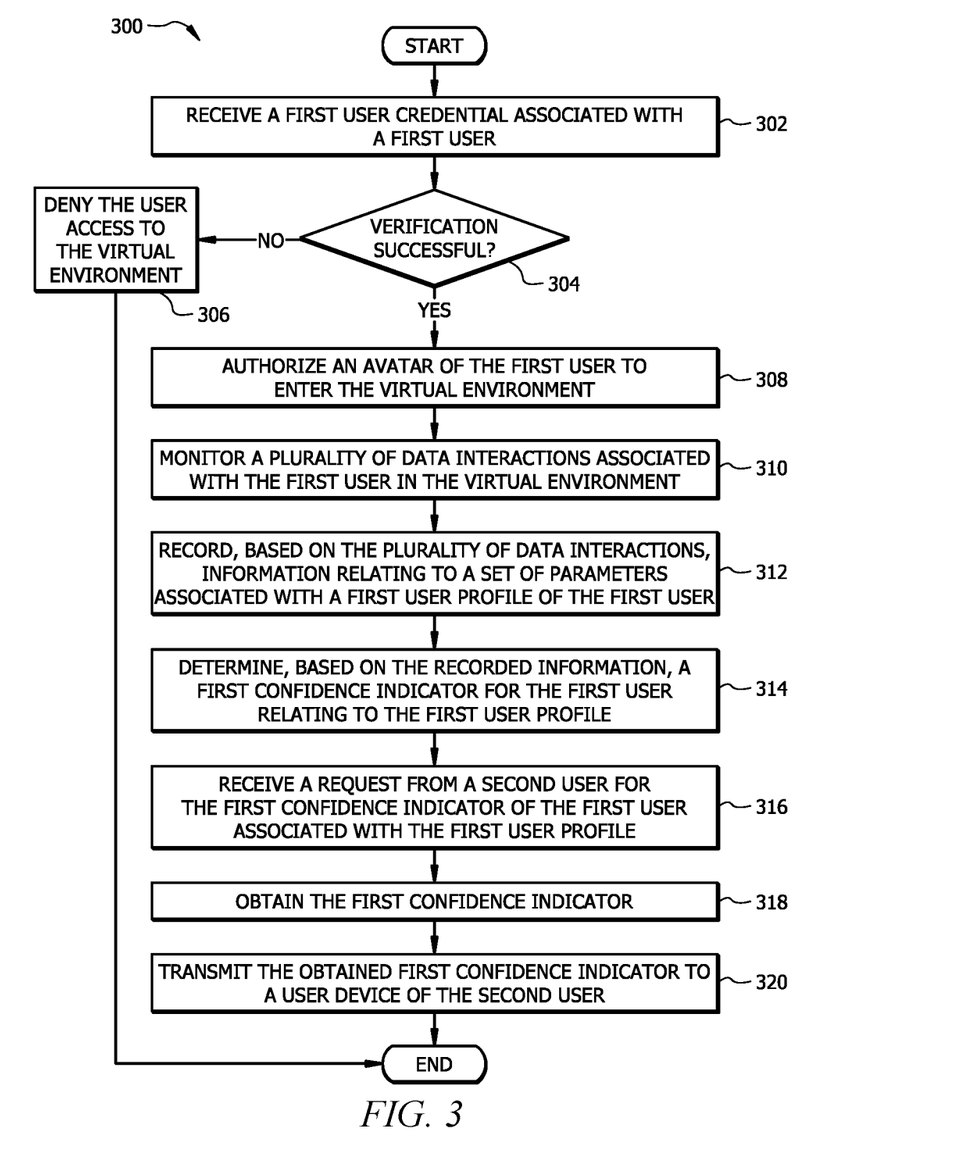
FIG. 3 illustrates a flowchart of an example method 300 for performing secure data interactions in a virtual environment 102, in accordance with one or more embodiments of the present disclosure.

The memory 204 is operable to store any of the information described with respect to FIGS. 1 and 3 along with any other data, instructions, logic, rules, or code operable to implement the function(s) described herein when executed by processor 202. For example, the memory 204 may store the instructions 220. The memory 204 comprises one or more disks, tape drives, or solid-state drives, and may be used as an over-flow data storage device, to store programs when such programs are selected for execution, and to store instructions and data that are read during program execution. Memory 204 is operable to store, for example, information relating to the identity of the user (e.g., at least a portion of user data 132), instructions for performing the functions of first user device 104 described herein, and any other data or instructions. The memory 204 may be volatile or non-volatile and may comprise read-only memory (ROM), random-access memory (RAM), ternary content-addressable memory (TCAM), dynamic random-access memory (DRAM), and static random-access memory (SRAM).

Display 206 is configured to present visual information to a user (for example, first user 110 in FIG. 1) in a virtual reality environment, an augmented reality environment or mixed reality environment. In other embodiments, the display 206 is configured to present visual information to the user as the virtual environment 102 (referring to FIG. 1) in real-time. In an embodiment, display 206 is a wearable optical display (e.g., glasses or a headset) configured to reflect projected images and enables a user to see through the display. For example, display 206 may comprise display units, lens, semi-transparent mirrors embedded in an eye glass structure, a visor structure, or a helmet structure. Examples of display units include, but are not limited to, a cathode ray tube (CRT) display, a liquid crystal display (LCD), a liquid crystal on silicon (LCOS) display, a light emitting diode (LED) display, an active-matrix OLED (AMOLED), an organic LED (OLED) display, a projector display, or any other suitable type of display as would be appreciated by one of ordinary skill in the art upon viewing this disclosure. In another embodiment, display 206 is a graphical display on a user device. For example, the graphical display may be the display of a tablet or smart phone configured to display virtual environment 102.

Examples of camera 208 include, but are not limited to, charge-coupled device (CCD) cameras and complementary metal-oxide semiconductor (CMOS) cameras. Camera 208 is configured to capture images of a wearer of first user device 104, such as first user 110. Camera 208 may be configured to capture images continuously, at predetermined intervals, or on-demand. For example, camera 208 may be configured to receive a command from first user 110 to capture an image. In another example, camera 208 is configured to continuously capture images to form a video stream. Camera 208 is communicably coupled to processor 202.

Examples of wireless communication interface 210 include, but are not limited to, a Bluetooth interface, an RFID interface, a near field communication interface, a local area network (LAN) interface, a personal area network interface, a wide area network (WAN) interface, a Wi-Fi interface, a ZigBee interface, or any other suitable wireless communication interface as would be appreciated by one of ordinary skill in the art upon viewing this disclosure. Wireless communication interface 210 is configured to facilitate processor 202 in communicating with other devices. For example, wireless communication interface 210 is configured to enable processor 202 to send and receive signals with other devices, such as second user device 106, the real-world server 130 and/or virtual-world server 150 (referring to FIG. 1). Wireless communication interface 210 is configured to employ any suitable communication protocol.

The network interface 212 is configured to enable wired and/or wireless communications. The network interface 212 is configured to communicate data between the first user device 104 and other network devices, systems, or domain(s). For example, the network interface 212 may comprise a WIFI interface, a local area network (LAN) interface, a wide area network (WAN) interface, a modem, a switch, or a router. The processor 202 is configured to send and receive data using the network interface 212. The network interface 212 may be configured to use any suitable type of communication protocol as would be appreciated by one of ordinary skill in the art.

Microphone 214 is configured to capture audio signals (e.g., voice signals or commands) from a user, such as first user 110. Microphone 214 is configured to capture audio signals continuously, at predetermined intervals, or on-demand. Microphone 214 is communicably coupled to processor 202.

GPS sensor 216 is configured to capture and to provide geographical location information. For example, GPS sensor 216 is configured to provide a geographic location of a user, such as first user 110, employing first user device 104. GPS sensor 216 may be configured to provide the geographic location information as a relative geographic location or an absolute geographic location. GPS sensor 216 may provide the geographic location information using geographic coordinates (i.e., longitude and latitude) or any other suitable coordinate system. GPS sensor 216 is communicably coupled to processor 202.

Examples of biometric devices 218 may include, but are not limited to, retina scanners, fingerprint scanners and facial scanners. Biometric devices 218 are configured to capture information about a person's physical characteristics and to output a biometric signal based on captured information. A biometric signal is a signal that is uniquely linked to a person based on their physical characteristics. For example, biometric device 218 may be configured to perform a retinal scan of the user's eye and to generate a biometric signal for the user based on the retinal scan. As another example, a biometric device 218 is configured to perform a fingerprint scan of the user's finger and to generate a biometric signal for the user based on the fingerprint scan. Biometric device 218 is communicably coupled to processor 202.

Referring back to FIG. 1, in one or more embodiments, one or both of the real-world server 130 and the virtual-world server 150, and one or more user devices (e.g., first user device 104 and/or second user device 106) may be part of an Information Technology (IT) infrastructure of an entity or organization. For example, second user 112 may be a representative of the organization who may use the second user device 106 to enter the virtual environment 102 and virtually interact with one or more users (e.g., first user 110) via the second avatar 116 to provide services to the first user 110.

The real-world server 130 may be configured to allow users (e.g., first user 110) registered with the real-world server 130 to perform one or more data interactions in the real-world environment. Data interactions performed in the real-world environment may be referred to as real-world data interactions. Similarly, virtual-world server 150 may be configured to allow users (e.g., first user 110) registered with the virtual-world server 150 to perform one or more data interactions in the virtual environment 102 (e.g., a metaverse environment). Data interactions performed in the virtual environment 102 may be referred to as virtual-world data interactions or virtual data interactions. In one embodiment, the real-world server 130 and the virtual-world server 150 are owned and/or operated by the same entity/organization. In this context, virtual-world server 150 may be configured to allow users (e.g., first user 110) registered with the real-world server 130 to perform one or more data interactions in the virtual environment 102 (e.g., a metaverse environment). In alternative embodiments, the real-world server 130 and the virtual-world server 150 may be owned and/or operated by different entities/organizations.

In one or more embodiments, as the first user 110 initially registers with the real-world server 130 in the real-world environment, the real-world server 130 may collect several pieces of information from the user including information relating to the identity of the user such as legal name, biometrics (e.g., fingerprints, retina scans, face ID etc.), residence address, phone numbers, assets owned by the user, and copies of government issued documents (e.g., driver permit, state identity card etc.). This information is stored by real-world server 130 as part of user data 132 of the first user 110. In one embodiment, at least a portion of the user data 132 relating to the first user 110 collected in the real-world environment may be stored in the virtual-world server 150. Once the identity of the first user 110 is confirmed and all other information provided by the first user 110 is verified to be correct, the real-world server 130 may generate a real-world data file 134 for the first user 110 in which the first user 110 may store real-world data objects 136 owned by the first user 110. In one example, the first user 110 may engage in a real-world data interaction with a service representative managing the real-world server 130 (e.g., physical interaction at an office location, over phone, voice chat etc.) to provide such information that can be used to register the first user 110 at the real-world server 130 and generate the real-world data file 134 of the first user 110. In another example, the first user 110 may engage in a real-world data interaction by accessing a webpage provided and managed by the real-world server 130. Once the first user 110 initiates a registration process via the webpage, the real-world server 130 may walk the first user 110 through several steps in which the first user 110 may be asked to provide information necessary to verify the identity of the first user 110 and register the first user 110 with the real-world server 130.

Information relating to the real-world data file 134 of the first user 110 may be stored as part of the user data 132 of the first user 110. This information may include, but is not limited to, an identity of the real-world data file 134, amount of real-world data objects 136 stored in the real-world data file 134, a log of data interactions conducted in relation to the real-world data file 134 and any other information relating to the real-world data file 134.

Once registered with the real-world server 130, the real-world server 130 may allow the first user 110 to perform one or more data interactions in the real-world environment. For example, a real-world data interaction may include transferring one or more real-world data objects 136 from the real-world data file 134 of the first user 110 to a second real-world data file (not shown) of the second user 112. Another example data interaction may include receiving one or more real-world data objects 136 in the real-world data file 134 of the first user 110 from the second real-world data file of the second user 112. Another example data interaction may include requesting by the first user 110 transfer of real-world data objects from a data file of a second user to a user data file of a third user as part of satisfying an agreement between the first user 110 and the third user. Another example data interaction may include modifying at least a portion of the user data 132 (e.g., user credentials to access the real-world server, phone numbers, residential address, email address, information relating to user assets etc.) stored at the real-world server 130. It may be noted that a data interaction in accordance with embodiments of the present disclosure refers to any interaction in the real-world environment and/or virtual environment 102 that includes transfer of data between computing nodes (e.g., first user device 104, second user device 106, real-world server 130 and virtual-world server 150).

The first user 110 may additionally register with the virtual-world server 150. In one embodiment, when initially registering with the virtual-world server 150, the first user 110 may provide to the virtual-world server 150 a credential (e.g., username and password) that provides the first user 110 access to the real-world server 130. In one embodiment, a single web page or web portal may allow the first user 110 to register with the real-world server 130 as well as the virtual-world server 150. The first user 110 may first register with the real-world server 130 as described above and generate credentials that allow the first user 110 access to the real-world server 130 and services provided by the real-world server 130. Once registered with the real-world server 130, the web portal may offer the first user 110 an option to additionally register with the virtual-world server 150 which may allow the first user 110 to perform data interactions in the virtual environment 102. Registration with the virtual-world server 150 may include generating a user credential 152 that allows the first user 110 to sign on to the virtual-world server 150 and enter the virtual environment 102 via first avatar 114 of the first user 110. Other users may register with the real-world server 130 and the virtual-world server 150 in a similar manner as the first user 110. For example, second user 112 may register with the virtual-world server 150 which may include generating a second user credential (not shown) that allows the second user 112 to sign on to the virtual-world server 150 and enter the virtual environment 102 via second avatar 116 of the second user 112.

Once registered with the virtual-world server 150, the first user 110 may generate a virtual data file 160 in which the first user 110 may store virtual data objects 162 owned by the first user 110. In one or more embodiments, the virtual data file 160 of the first user 110 is associated with the real-world data file 134 of the first user 110. For example, the virtual data file 160 is a virtual image of the real-world data file 134, wherein the virtual data objects 162 correspond to the real-world data objects 136. In other words, the virtual data file 160 is a virtual representation of the real-world data file 134. In another example, the virtual data file 160 stores a portion of the real-world data objects 136 in the form of virtual data objects 162. In another example, real-world data objects 136 may be converted to virtual data objects 162, and vice versa. In this case, there may not be a one-to-one conversion between the real-world data objects 136 and virtual data objects 162. For example, one real-world data object 136 may be converted to a plurality of virtual data objects 162, wherein the conversion ratio may dynamically change from time to time.

Information relating to the virtual data file 160 of the first user 110 may be stored by the virtual-world server 150. This information may include, but is not limited to, an identity of the virtual data file 160, amount of virtual data objects 162 stored in the virtual data file 160, a log of virtual data interactions conducted in the virtual environment 102 in relation to the virtual data file 160 and any other information relating to the virtual data file 160.

Once registered with the virtual-world server 150, the virtual-world server 150 may allow the first user 110 to perform one or more virtual data interactions. For example, a virtual data interaction may include transferring one or more virtual data objects 162 from the virtual data file 160 of the first user 110 to a second virtual data file (not shown) of the second user 112. Another example data interaction may include receiving one or more virtual data objects 162 in the virtual data file 160 of the first user 110 from the second virtual data file of the second user 112. Another example data interaction may include requesting by the first user 110 transfer of virtual data objects from a data file of a second user to a data file of a third user as part of satisfying an agreement between the first user 110 and the third user.

In one or more embodiments, the virtual data file (e.g. virtual data file 160) is a software application running on a computing node owned and/or operated by the respective user (e.g., first user 110). For example, when the first user 110 desires to receive virtual data objects 162 from a virtual data file of the second user 112, first user 110 may direct the second user 112 to a unique cryptographic address (e.g., public key) issued by the virtual data file 160. In one embodiment, the virtual data file 160 may not itself store the virtual data objects 162 but may store information that points to a location of the virtual data objects 162, for example, on a server (e.g., virtual-world server 150). Virtual data file 160 may be web-based or hardware-based. For example, virtual data file 160 may be stored in a mobile device or a desktop computer connected to the internet. Additionally or alternatively, virtual data file 160 may be stored in a device (e.g., USB drive) that is not connected to the network 180.

With the advent of virtual-world technology such as metaverse technology that allows users to enter mixed reality environments and perform data interactions, data security has become a challenge as the development of metaverse related technologies is still at a nascent stage and standardized systems that provide robust data security are not yet in place. For example, a bad actor may pretend to be another user in a virtual environment which then allows the bad actor to interact with other users, gain access to other users' information, and avail services reserved only for authorized users. Present virtual-world technologies (e.g., metaverse technologies) do not provide robust systems and processes that can reliably verify the credibility of a user operating in the virtual environment 102. Thus, data interactions conducted in the virtual environment 102 are prone to deception, data theft and other security threats.

Embodiments of the present disclosure discuss techniques that intelligently and reliably verify credibility of a user in a virtual environment and help improve security of data interactions conducted in the virtual environment as well as the real-world environment.

Virtual-world server 150 may be configured to generate one or more confidence indicators 158 for the first user 110 that are indicative of a credibility of the first user 110 in the virtual environment 102 as well as the real-world environment. Several user profiles 154 may be defined and associated with the first user 110, wherein each user profile 154 of the first user 110 represents a specific set of skills and/or characteristics related to the first user 110. Virtual-world server 150 may be configured to generate and maintain several confidence indicators 158 for the first user 110, wherein each confidence indicator 158 of the first user 110 is associated with a different user profile 154 related to the first user 110. Thus, the confidence indicator 158 associated with each user profile 154 is indicative of a credibility and/or reputation of the first user 110 with regard to the specific set of skills and/or characteristics of the first user 110 represented by the user profile 154.

Examples of user profiles 154 may include, but are not limited to, engineering, financial, legal, medicine, fitness, and nutrition. For example, an engineering user profile of the first user 110 may represent specific engineering skills that the first user 110 may possess. A confidence indicator 158 of the first user 110 associated with the engineering profile of the first user 110 is indicative of a proficiency of the first user 110 relating to the specific engineering skills represented by the engineering profile. In another example, a fitness user profile of the first user 110 may represent fitness related skills (e.g., formal fitness education, experience as fitness instructor etc.) that the first user 110 may possess. A confidence indicator 158 of the first user 110 associated with the fitness profile of the first user 110 is indicative of a proficiency of the first user 110 in fitness related skills represented by the fitness profile. In another example, a security profile of the first user 110 may represent a security level associated with the first user 110. A confidence indicator 158 of the first user 110 associated with the security profile of the first user 110 is indicative of a security credibility of the first user 110. For example, the confidence indicator 158 of the first user 110 associated with the security profile indicates to other users a level of security associated with engaging in virtual data interactions with the first user 110.

Virtual-world server 150 may be configured to generate and/or update the confidence indicators 158 related to the first user 110 based on monitoring data interactions related to the first user 110 that are performed in the virtual environment 102 and/or the real-world environment. Virtual-world server 150 may be configured to monitor several data interactions related to the first user 110 that are performed in the virtual environment 102 and/or the real-world environment. Data interactions related to the first user 110 may include, but are not limited to, data interactions performed by the first user 110 (e.g., with a second user 112 or entity) in the virtual environment 102 and data interactions performed by other users (e.g., second user 112) or entities in the virtual environment 102 that relate to the first user 110. Examples of data interactions performed by the first user 110 in the virtual environment 102 may include, but are not limited to, transferring virtual data objects 162 to a second user 112 or entity, receiving virtual data objects 162 from the second user 112 or entity, and attending a virtual event (e.g., virtual class, virtual conference, virtual seminar, virtual meeting etc.) in the virtual environment 102. Examples of data interactions performed by other users (e.g., second user 112) or entities in the virtual environment 102 and/or real-world environment that relate to the first user 110 may include, but are not limited to, an entity issuing a virtual award to the first user 110, an educational entity issuing an educational degree/diploma to the first user 110, the second user 112 publishing a recommendation related to a specific skill of the first user 110 on a virtual platform in the virtual environment, and an entity registering and admitting the first user 110 in a virtual group.

Based on monitoring the data interactions related to the first user 110, virtual-world server 150 may be configured to record information relating to a plurality of profile parameters 156. Each profile parameter 156 represents a specific skill, behavior and/or characteristic associated with the first user 110. Examples of profile parameters 156 may include, but are not limited to, confidence indicators 158 of other users (e.g., second user 112) the first user 110 interacts with in the virtual environment 102, amount of virtual data object 162 sent or received by the first user 110, confirmation of virtual events attended by the first user 110, virtual awards received by the first user 110, educational degrees/diplomas received by the first user 110, recommendations received by the first user 110, confirmation of admission of the first user 110 to virtual groups, and confirmation of registration of the first user 110 to an entity/organization. For example, when the first user 110 conducts a virtual fitness class in the virtual environment 102, virtual-world server 150 records this event as a profile parameter 156 related to the first user 110. In another example, when the first user 110 is issued an award by a virtual entity in the virtual environment 102, virtual-world server 150 records this event as a profile parameter 156 related to the first user 110.

A confidence indicator 158 associated with a user profile 154 related to the first user 110 may be based on a specific set of profile parameters 156 from the plurality of profile parameters 156 recorded for the first user 110 by the virtual-world server 150. In one embodiment, each user profile 154 may be based on a different set of profile parameters 156. For example, a confidence indicator 158 associated with an engineering profile of the first user 110 may be generated/updated based on a set of profile parameters 156 including, but not limited to, engineering degrees/diplomas received by the first user 110, engineering awards received by the first user 110, work experience of the first user 110 as an engineer (e.g., number of years worked in an engineering role), memberships to virtual engineering groups, virtual interaction with other engineers in the virtual environment 102, and engineering conferences attended by the first user 110. In another example, a confidence indicator 158 associated with a fitness profile of the first user 110 may be generated/updated based on a set of profile parameters 156 including, but not limited to, fitness related degrees/diplomas received by the first user 110, fitness related awards received by the first user 110, experience as a fitness instructor (e.g., a number of fitness classes conducted by the first user 110), a length of time the first user is registered as a fitness instructor with a fitness related entity, memberships to fitness groups, and virtual interaction with other fitness related entities or users.

Virtual-world server 150 may be configured to build one or more confidence indicators 158 (e.g., associated with respective user profiles 154) for the first user 110 over time as information regarding more and more data interactions related to the first user 110 is recorded. For example, a confidence indicator 158 of the first user 110 associated with a respective user profile 154 may be initialized with a default numerical value (e.g., 1, 10, 100 etc.). The confidence indicator 158 may be updated with each recorded data interaction related to the first user 110 that occurs in the virtual environment 102. For example, a confidence indicator 158 associated with a fitness profile of the first user 110 may first be initialized and assigned a default value of 100. With each piece of user data 132 related to the first user 110 that is collected and each virtual data interaction related to the first user 110 that is recorded, virtual-world server 150 updates the confidence indicator. For example, when a data interaction related to the first user 110 receiving a fitness related diploma is detected, virtual-world server 150 records the diploma as a profile parameter 156 related to the first user 110 and increments the confidence indicator 158 associated with the fitness profile by a selected amount. Subsequently, when a data interaction related to the first user 110 conducting a virtual fitness class is detected, virtual-world server 150 records this event as a profile parameter 156 related to the first user 110 and further increments the confidence indicator 158 by another selected amount. Thus, the confidence indicator 158 associated with a user profile 154 increases in value as more profile parameters 156 related to the user profile 154 are recorded. A higher numerical value of the confidence indicator is indicative of a higher credibility and/or reputation. Thus, the credibility/reputation of the first user 110 associated with a user profile 154 may increase over time as more profile parameters 156 associated with the user profile 154 are recorded. It may be noted that each profile parameter 156 may be associated with a same or different pre-selected increment value. When a profile parameter 156 is recorded based on a data interaction related to the first user 110, a confidence indicator 158 associated with the profile parameter 156 is incremented by the respective pre-selected increment value of the profile parameter 156.

In some cases, virtual-world server 150 may lower (e.g., decrease) the confidence indicator 158 associated with a user profile 154 of the first user 110 in response to recording profile parameters 156 that negatively affect the credibility and/or reputation of the first user 110. For example, when the first user 110 receives a negative recommendation from a reputed user/entity (e.g., another user having a high confidence indicator), virtual-world server 150 may decrement the confidence indicator 158 by a pre-selected amount. In another example, in response to detecting that a membership of the first user 110 to a virtual group was cancelled by an entity managing the virtual group, virtual-world server 150 may decrement the confidence indicator 158 by a pre-selected amount.

In one or more embodiments, virtual-world server 150 may be configured to adjust a confidence indicator 158 associated with the first user 110 based on virtual data interactions of the first user 110 with other users in the virtual environment 102. For example, in response to detecting that the first user 110 performed a data interaction with the second user 112 in the virtual environment 102, virtual-world server 150 may be configured to adjust a confidence indicator 158 of the first user 110 based on a confidence indicator 158 of the second user 112. For example, virtual-world server 150 may decrement the confidence indicator 158 of the first user 110 by a pre-selected amount when the corresponding confidence indicator 158 of the second user 112 is equal to or below a threshold value. On the other hand, virtual-world server 150 may increment the confidence indicator 158 of the first user 110 by a pre-selected amount when the corresponding confidence indicator 158 of the second user 112 exceeds a threshold value. In one example, a confidence indicator 158 associated with a security profile of the first user 110 may be adjusted based on a corresponding confidence indicator 158 associated with the security profile of the second user 112. The assumption here is that users who interact with less credible users (e.g., having lower confidence indicators) are more prone to security risks as compared to users who interact with highly credible users (e.g., having high confidence indicators). Thus, when the first user 110 interacts with users with low confidence indicators 158, virtual-world server 150 lowers the corresponding confidence indicator of the first user 110. On the other hand, when the first user 110 interacts with users with high confidence indicators, virtual-world server 150 raises the corresponding confidence indicator of the first user 110.

Virtual-world server 150 may be configured to generate and maintain (e.g., update based on newly recorded profile parameters) custom confidence indicators 158 for the first user 110 based on a set of profile parameters 156 selected by the first user 110. For example, virtual-world server 150 may allow the first user 110 to select a set of profile parameters 156 based on which a custom confidence indicator 158 is to be generated and maintained for the first user 110. First user 110 may also define a custom user profile that is to be associated with the selected set of profile parameters 156. In response to receiving a request from the first user 110 for generating the custom confidence indicator 158 associated with the custom user profile of the first user 110 based on a selected set of profile parameters 156, virtual-world server 150 may start recording information relating to the selected set of profile parameters 156. Virtual-world server generates and continually updates the custom confidence indicator 158 based on the recorded set of profile parameters 156. This mechanism allows the first user 110 to generate custom confidence indicators for use by other users and entities in the virtual environment 102. For example, first user 110 may select a set of profile parameters 156 that relate to a specific engineering skill set needed by an engineering entity to admit users to an elite virtual engineering group in the virtual environment 102. The customized confidence indicator may allow the engineering entity to verify proficiency of the first user 110 relating to the specific skill set and may help the first user 110 to secure an admission to the elite engineering group. In alternative or additional embodiments, virtual-world server 150 may be configured to generate and maintain (e.g., update based on newly recorded profile parameters) for the first user 110 one or more default confidence indicators 158 associated with one or more respective default user profiles 154 that are based on one or more respective default sets of profile parameters 156. For example, virtual-world server 150 may generate and maintain for the first user 110 a default confidence indicator 158 associated with a default user profile 154 that is based on a default set of profile parameters 156. For instance, by default the virtual-world server 150 may generate and maintain for the first user 110 a confidence indicator 158 associated with a security profile of the user based on a default set of profile parameters 156 indicative of security characteristics of the first user 110.

In certain embodiments, a second user 112 may request the virtual-world server 150 for one or more confidence indicators 158 associated with one or more respective user profiles 154 of the first user 110. The second user 112 may perform one or more data interactions related to the first user 110 in the virtual environment 102 based on one or more confidence indicators 158 of the first user 110. For example, the second user 112 may request a confidence indicator 158 associated with the security profile of the first user 110 and then decide to transfer virtual data objects 162 to the first user 110 or receive virtual data objects 162 from the first user 110 based on the confidence indicator 158 of the first user 110. For instance, if the confidence indicator 158 associated with the security profile of the first user 110 is low (e.g., lower than a threshold value) indicating a high security risk associated with the first user 110, the second user 112 may decide to not engage in data interactions with the first user 110 to avoid a data breach. Thus, the confidence indicators 158 may improve data security in the virtual environment 102. In certain embodiments, the second user 112 or entity may use confidence indicators 158 associated with certain user profiles 154 of the first user 110 to make certain decisions relating to the first user 110. For example, an engineering firm wanting to add engineers having certain skills to their team may request for a confidence indicator 158 associated with an engineering profile of the first user 110. The engineering firm may decide to add the first user 110 to their team only when the confidence indicator 158 of the first user equals or exceeds a threshold value. In another example, a virtual fitness school wanting to add fitness instructors to their team may request for a confidence indicator 158 associated with a fitness profile of the first user 110. The fitness school may decide to add the first user 110 to their team only when the confidence indicator 158 of the first user 110 equals or exceeds a threshold value.

Virtual-world server 150 may be configured to provide upon request from a second user 112 or entity one or more confidence indicators 158 associated with one or more respective user profiles 154 of the first user 110. In one embodiment, virtual-world server 150 may provide to the second user 112 or entity only those confidence indicators 158 the second user 112 or entity is authorized to obtain. For example, virtual-world server 150 may register the second user 112 to obtain confidence indicators 158 of other users (e.g., first user 110) associated with certain user profiles 154. In this case, virtual-world server 150 may provide to the second user 112 confidence indicators 158 associated with only those user profiles 154 the second user 112 is registered to receive. The virtual-world server 150 may not provide the second user 112 confidence indicators 158 associated with those user profiles 154 the second user 112 is not registered to receive. For example, an engineering firm may be registered to receive confidence indicators 158 of other users associated with engineering profiles only. This limits users and entities in the virtual environment 102 to obtain only that information about other users which is relevant to their needs. By controlling dissemination of user information, virtual-world server 150 improves data security in the virtual environment 102. In one embodiment, virtual-world server 150 may be configured to indicate the requested one or more confidence indicators 158 to the second user 112 in the virtual environment 102. For example, virtual-world server 150 may transmit a requested confidence indicator 158 to the second user device 106 which may display the confidence indicator 158 to the second user on a display of the second user device 106.

In additional or alternative embodiments, the virtual-world server 150 may be configured to generate a confidence indicator 158 associated with the first user 110 based on a requested set of profile parameters 156. For example, virtual-world server 150 may receive a request from the second user 112 for a confidence indicator 158 related to the first user 110 based on a set of profile parameters 156 selected by the second user 112. The set of profile parameters 156 selected by the second user 112 may or may not relate to a user profile 154 defined for the first user 110. In response to receiving the request from the second user 112, virtual-world server 150 checks whether information was recorded for the first user 110 relating to one or more profile parameters 156 of the set of profile parameters 156 included in the request. Upon determining that information was recorded for one or more of the requested profile parameters 156, virtual-world server 150 generates a confidence indicator 158 for the first user 110 based on the one or more profile parameters 156 requested by the second user 112. Virtual-world server 150 may be configured to indicate the generated confidence indicator 158 to the second user 112 in the virtual environment 102. For example, virtual-world server 150 may transmit the generated confidence indicator 158 to the second user device 106 which may display the confidence indicator 158 to the second user on a display of the second user device 106.

Virtual-world server 150 may be configured to authorize and/or perform certain data interactions related to the first user 110 based on one or more confidence indicators 158 associated with the first user 110. For example, when a second user 112 requests to transfer virtual data objects 162 to the first user 110 or receive virtual data objects 162 from the first user 110, virtual-world server 150 authorizes the requested data interaction only when the confidence indicator 158 associated with the security profile of the first user 110 equals or exceeds a threshold value. In another example, virtual-world server 150 may be configured by the second user 112 or an entity to add users to a designated virtual engineering group based on confidence indicators 158 associated with those users. When the first user 110 requests to be added to the virtual engineering group, virtual-world server 150 adds the first user 110 to the virtual engineering group when the confidence indicator 158 associated with the engineering profile of the first user 110 equals or exceeds a threshold value.

FIG. 3 illustrates a flowchart of an example method 300 for performing secure data interactions in a virtual environment 102, in accordance with one or more embodiments of the present disclosure. Method 300 may be performed by the virtual-world server 150 shown in FIG. 1.

At operation 302, virtual-world server 150 receives a user credential 152 associated with a first user 110, wherein the user credential 152 provides the first user 110 access to a virtual environment 102.

At operation 304, virtual-world server 150 verifies the user credential 152. If the verification is unsuccessful, method 300 proceeds to operation 306 where virtual-world server 150 denies the first user 110 access to the virtual environment. On the other hand, if the user credential 152 is successfully verified, method 300 proceeds to operation 308 where virtual-world server 150 authorizes, based on the user credential 152, an avatar (e.g., first avatar 114) of the first user 110 to enter the virtual environment 102.

As described above, virtual-world server 150 may be configured to use a user credential 152 collected from the first user 110, generated by the first user 110 or assigned to the first user 110 during real-world data interactions with the first user 110, to verify identity of the first user 110 in the virtual environment 102. Thus, the user credential 152 provides the first user 110 access to the virtual environment 102. For example, the user credential 152 may be used by the virtual-world server 150 to verify that the first avatar 114 belongs to and is controlled by the first user 110.

In one example, user credential 152 may include a username and password generated by the first user 110 as part of registering with the real-world server 130. The virtual-world server 150 may allow the first user 110 to use the same username and password to enter the virtual environment 102 via first avatar 114. In an alternative embodiment, the first user 110 may generate a separate user credential (different from the user credential 152) as part of registering with the real-world server 130 and use the separate user credential to log into the real-world server 130 and perform real-world data interaction. The first user 110 may separately generate user credential 152 as part of registering with the virtual-world server 150 (e.g., during a real-world data interaction with the real-world server 130). Once the first user 110 has registered with the virtual-world server 150 and generated the user credential 152, the first user 110 may use the user credential 152 to log into the virtual-world server 150 and perform virtual-world data interactions.

At operation 310, virtual-world server 150 monitors a plurality of data interactions associated with the first user 110 that are performed in the virtual environment 102.

As described above, virtual-world server 150 may be configured to generate one or more confidence indicators 158 for the first user 110 that are indicative of a credibility of the first user 110 in the virtual environment 102 as well as the real-world environment. Several user profiles 154 may be defined and associated with the first user 110, wherein each user profile 154 of the first user 110 represents a specific set of skills and/or characteristics related to the first user 110. Virtual-world server 150 may be configured to generate and maintain several confidence indicators 158 for the first user 110, wherein each confidence indicator 158 of the first user 110 is associated with a different user profile 154 related to the first user 110. Thus, the confidence indicator 158 associated with each user profile 154 is indicative of a credibility and/or reputation of the first user 110 with regard to the specific set of skills and/or characteristics of the first user 110 represented by the user profile 154.

Virtual-world server 150 may be configured to generate and/or update the confidence indicators 158 related to the first user 110 based on monitoring data interactions related to the first user 110 that are performed in the virtual environment 102 and/or the real-world environment. Virtual-world server 150 may be configured to monitor several data interactions related to the first user 110 that are performed in the virtual environment 102 and/or the real-world environment. Data interactions related to the first user 110 may include, but are not limited to, data interactions performed by the first user 110 (e.g., with a second user 112 or entity) in the virtual environment 102 and data interactions performed by other users (e.g., second user 112) or entities in the virtual environment 102 that relate to the first user 110. Examples of data interactions performed by the first user 110 in the virtual environment 102 may include, but are not limited to, transferring virtual data objects 162 to a second user 112 or entity, receiving virtual data objects 162 from the second user 112 or entity, and attending a virtual event (e.g., virtual class, virtual conference, virtual seminar, virtual meeting etc.) in the virtual environment 102. Examples of data interactions performed by other users (e.g., second user 112) or entities in the virtual environment 102 and/or real-world environment that relate to the first user 110 may include, but are not limited to, an entity issuing a virtual award to the first user 110, an educational entity issuing an educational degree/diploma to the first user 110, the second user 112 publishing a recommendation related to a specific skill of the first user 110 on a virtual platform in the virtual environment, and an entity registering and admitting the first user 110 in a virtual group.

At operation 312, virtual-world server 150 records, based on the plurality of data interactions associated with the first user 110, information relating to a set of parameters (e.g., a set of profile parameters 156), wherein the set of parameters corresponds to a first user profile 154 of a plurality of user profiles 154 associated with the first user 110. Each parameter of the set of parameters defiles a characteristic associated with the first user 110 related to the user profile 154.

As described above, based on monitoring the data interactions related to the first user 110, virtual-world server 150 may be configured to record information relating to a plurality of profile parameters 156. Each profile parameter 156 represents a specific skill, behavior and/or characteristic associated with the first user 110. Examples of profile parameters 156 may include, but are not limited to, confidence indicators 158 of other users (e.g., second user 112) the first user 110 interacts with in the virtual environment 102, amount of virtual data object 162 sent or received by the first user 110, confirmation of virtual events attended by the first user 110, virtual awards received by the first user 110, educational degrees/diplomas received by the first user 110, recommendations received by the first user 110, confirmation of admission of the first user 110 to virtual groups, and confirmation of registration of the first user 110 to an entity/organization. For example, when the first user 110 conducts a virtual fitness class in the virtual environment 102, virtual-world server 150 records this event as a profile parameter 156 related to the first user 110. In another example, when the first user 110 is issued an award by a virtual entity in the virtual environment 102, virtual-world server 150 records this event as a profile parameter 156 related to the first user 110.

A confidence indicator 158 associated with a user profile 154 related to the first user 110 may be based on a specific set of profile parameters 156 from the plurality of profile parameters 156 recorded for the first user 110 by the virtual-world server 150. In one embodiment, each user profile 154 may be based on a different set of profile parameters 156. For example, a confidence indicator 158 associated with an engineering profile of the first user 110 may be generated/updated based on a set of profile parameters 156 including, but not limited to, engineering degrees/diplomas received by the first user 110, engineering awards received by the first user 110, work experience of the first user 110 as an engineer (e.g., number of years worked in an engineering role), memberships to virtual engineering groups, virtual interaction with other engineers in the virtual environment 102, and engineering conferences attended by the first user 110. In another example, a confidence indicator 158 associated with a fitness profile of the first user 110 may be generated/updated based on a set of profile parameters 156 including, but not limited to, fitness related degrees/diplomas received by the first user 110, fitness related awards received by the first user 110, experience as a fitness instructor (e.g., a number of fitness classes conducted by the first user 110), a length of time the first user is registered as a fitness instructor with a fitness related entity, memberships to fitness groups, and virtual interaction with other fitness related entities or users.

At operation 314, virtual-world server 150 determines, based on the recorded information relating to the set of profile parameters 156, a first confidence indicator 158 for the first user 110 relating to the first user profile 154 associated with the first user 110.

As described above, virtual-world server 150 may be configured to build one or more confidence indicators 158 (e.g., associated with respective user profiles 154) for the first user 110 over time as information regarding more and more data interactions related to the first user 110 is recorded. For example, a confidence indicator 158 of the first user 110 associated with a respective user profile 154 may be initialized with a default numerical value (e.g., 1, 10, 100 etc.). The confidence indicator 158 may be updated with each recorded data interaction related to the first user 110 that occurs in the virtual environment 102. For example, a confidence indicator 158 associated with a fitness profile of the first user 110 may first be initialized and assigned a default value of 100. With each piece of user data 132 related to the first user 110 that is collected and each virtual data interaction related to the first user 110 that is recorded, virtual-world server 150 updates the confidence indicator. For example, when a data interaction related to the first user 110 receiving a fitness related diploma is detected, virtual-world server 150 records the diploma as a profile parameter 156 related to the first user 110 and increments the confidence indicator 158 associated with the fitness profile by a selected amount. Subsequently, when a data interaction related to the first user 110 conducting a virtual fitness class is detected, virtual-world server 150 records this event as a profile parameter 156 related to the first user 110 and further increments the confidence indicator 158 by another selected amount. Thus, the confidence indicator 158 associated with a user profile 154 increases in value as more profile parameters 156 related to the user profile 154 are recorded. A higher numerical value of the confidence indicator is indicative of a higher credibility and/or reputation. Thus, the credibility/reputation of the first user 110 associated with a user profile 154 may increase over time as more profile parameters 156 associated with the user profile 154 are recorded. It may be noted that each profile parameter 156 may be associated with a same or different pre-selected increment value. When a profile parameter 156 is recorded based on a data interaction related to the first user 110, a confidence indicator 158 associated with the profile parameter 156 is incremented by the respective pre-selected increment value of the profile parameter 156.

In some cases, virtual-world server 150 may lower (e.g., decrease) the confidence indicator 158 associated with a user profile 154 of the first user 110 in response to recording profile parameters 156 that negatively affect the credibility and/or reputation of the first user 110. For example, when the first user 110 receives a negative recommendation from a reputed user/entity (e.g., another user having a high confidence indicator), virtual-world server 150 may decrement the confidence indicator 158 by a pre-selected amount. In another example, in response to detecting that a membership of the first user 110 to a virtual group was cancelled by an entity managing the virtual group, virtual-world server 150 may decrement the confidence indicator 158 by a pre-selected amount.

In one or more embodiments, virtual-world server 150 may be configured to adjust a confidence indicator 158 associated with the first user 110 based on virtual data interactions of the first user 110 with other users in the virtual environment 102. For example, in response to detecting that the first user 110 performed a data interaction with the second user 112 in the virtual environment 102, virtual-world server 150 may be configured to adjust a confidence indicator 158 of the first user 110 based on a confidence indicator 158 of the second user 112. For example, virtual-world server 150 may decrement the confidence indicator 158 of the first user 110 by a pre-selected amount when the corresponding confidence indicator 158 of the second user 112 is equal to or below a threshold value. On the other hand, virtual-world server 150 may increment the confidence indicator 158 of the first user 110 by a pre-selected amount when the corresponding confidence indicator 158 of the second user 112 exceeds a threshold value. In one example, a confidence indicator 158 associated with a security profile of the first user 110 may be adjusted based on a corresponding confidence indicator 158 associated with the security profile of the second user 112. The assumption here is that users who interact with less credible users (e.g., having lower confidence indicators) are more prone to security risks as compared to users who interact with highly credible users (e.g., having high confidence indicators). Thus, when the first user 110 interacts with users with low confidence indicators 158, virtual-world server 150 lowers the corresponding confidence indicator of the first user 110. On the other hand, when the first user 110 interacts with users with high confidence indicators, virtual-world server 150 raises the corresponding confidence indicator of the first user 110.

At operation 316, virtual-world server 150 receives a request from a second user 112 for the first confidence indicator 158 of the first user 110 that relates to the first user profile 154 associated with the first user 110.

As described above, a second user 112 may request the virtual-world server 150 for one or more confidence indicators 158 associated with one or more respective user profiles 154 of the first user 110. The second user 112 may perform one or more data interactions related to the first user 110 in the virtual environment 102 based on one or more confidence indicators 158 of the first user 110. For example, the second user 112 may request a confidence indicator 158 associated with the security profile of the first user 110 and then decide to transfer virtual data objects 162 to the first user 110 or receive virtual data objects 162 from the first user 110 based on the confidence indicator 158 of the first user 110. For instance, if the confidence indicator 158 associated with the security profile of the first user 110 is low (e.g., lower than a threshold value) indicating a high security risk associated with the first user 110, the second user 112 may decide to not engage in data interactions with the first user 110 to avoid a data breach. Thus, the confidence indicators 158 may improve data security in the virtual environment 102. In certain embodiments, the second user 112 or entity may use confidence indicators 158 associated with certain user profiles 154 of the first user 110 to make certain decisions relating to the first user 110. For example, an engineering firm wanting to add engineers having certain skills to their team may request for a confidence indicator 158 associated with an engineering profile of the first user 110. The engineering firm may decide to add the first user 110 to their team only when the confidence indicator 158 of the first user equals or exceeds a threshold value. In another example, a virtual fitness school wanting to add fitness instructors to their team may request for a confidence indicator 158 associated with a fitness profile of the first user 110. The fitness school may decide to add the first user 110 to their team only when the confidence indicator 158 of the first user 110 equals or exceeds a threshold value.

At operation 318, virtual-world server 150 obtains the first confidence indicator 158 of the first user 110 that is associated with the first user profile 154.

As described above, virtual-world server 150 may be configured to provide upon request from a second user 112 or entity one or more confidence indicators 158 associated with one or more respective user profiles 154 of the first user 110. In one embodiment, virtual-world server 150 may provide to the second user 112 or entity only those confidence indicators 158 the second user 112 or entity is authorized to obtain. For example, virtual-world server 150 may register the second user 112 to obtain confidence indicators 158 of other users (e.g., first user 110) associated with certain user profiles 154. In this case, virtual-world server 150 may provide to the second user 112 confidence indicators 158 associated with only those user profiles 154 the second user 112 is registered to receive. The virtual-world server 150 may not provide the second user 112 confidence indicators 158 associated with those user profiles 154 the second user 112 is not registered to receive. For example, an engineering firm may be registered to receive confidence indicators 158 of other users associated with engineering profiles only. This limits users and entities in the virtual environment 102 to obtain only that information about other users which is relevant to their needs. By controlling dissemination of user information, virtual-world server 150 improves data security in the virtual environment 102.

At operation 320, virtual-world server 150 transmits the obtained first confidence indicator 158 of the first user 110 to a user device (e.g., second user device 106) of the second user 112 for presenting to the second user 112 in the virtual environment 102.

As described above, virtual-world server 150 may be configured to indicate the requested one or more confidence indicators 158 to the second user 112 in the virtual environment 102. For example, virtual-world server 150 may transmit a requested confidence indicator 158 to the second user device 106 which may display the confidence indicator 158 to the second user on a display of the second user device 106.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
a memory that stores a user credential associated with a first user; and at least one processor coupled to the memory, and configured to:
receive the user credential associated with the first user, wherein the user credential provides the first user access to a virtual environment;
authorize, based on the user credential, an avatar of the first user to enter the virtual environment;
monitor a plurality of data interactions associated with the first user that are performed in the virtual environment;
record, based on the plurality of data interactions, information relating to a set of parameters, wherein the set of parameters corresponds to a first user profile of a plurality of user profiles associated with the first user, wherein each parameter of the set of parameters defines a characteristic of the first user related to the first user profile;
determine, based on the recorded information relating to the set of parameters, a first confidence indicator for the first user relating to the first user profile associated with the first user;
receive a request from a second user for the first confidence indicator of the first user that relates to the first user profile associated with the first user, wherein the second user is registered to receive confidence indicators from a first set of user profiles associated with a virtual organization and the first user profile is part of the first set of user profiles;
in response to receiving the request from the second user for the first confidence indicator, determine whether the first user profile associated with the first confidence indicator is included in the first set of user profiles associated with the virtual organization;
obtain the first confidence indicator of the first user that is associated with the first user profile in response to determining that the first user profile associated with the first confidence indicator is included in the first set of user profiles; and
transmit the obtained first confidence indicator to a user device of the second user for presenting to the second user in the virtual environment.

2. The system of claim 1, wherein:
the plurality of data interactions associated with the first user comprises a data interaction performed by the first user with a third user in the virtual environment;
the set of parameters comprises a second confidence indicator of the third user;
the first confidence indicator and the second confidence indicator are numerical values;
the at least one processor is configured to update the first confidence indicator of the first user by:
decreasing the first confidence indicator by a first amount when the second confidence indicator of the third user is below a threshold; and
increasing the first confidence indicator by a second amount when the second confidence indicator of the third user equals or exceeds the threshold.

3. The system of claim 1, wherein the at least one processor is further configured to:
receive a request from the first user to generate a custom user profile based on a selected set of parameters;
record, based on the plurality of data interactions, information relating to the selected set of parameters;
determine, based on the recorded information relating to the selected set of parameters, a custom confidence indicator for the first user; and
assign the custom confidence indicator to the custom user profile.

4. The system of claim 1, wherein the at least one processor is further configured to:
record, based on the plurality of data interactions, information relating to a default set of parameters; and
determine a second confidence indicator for the first user based on the recorded information relating to the default set of parameters.

5. The system of claim 4, wherein the default set of parameters corresponds to a default user profile of the first user.

6. The system of claim 1, wherein the at least one processor is configured to determine the first confidence indicator for the first user relating to the first user profile by adjusting the first confidence indicator based on the recorded information relating to the first set of parameters.

7. The system of claim 1, wherein the at least one processor is further configured to:
receive a second request from a third user for a second confidence indicator of the first user based on a selected set of parameters;
determining that information was recorded for one or more parameters of the selected set of parameters;
generate the second confidence indicator for the first user based on the one or more parameters of the selected set of parameters; and
transmit the second confidence indicator to a user device of the third user for presenting to the third user in the virtual environment.

8. The system of claim 1, wherein the at least one processor is further configured to:
receive a request from the second user to perform a data interaction associated with the first user;
compare the first confidence indicator of the first user with a threshold confidence indicator; and
when the first confidence indicator equals or exceeds the threshold confidence indicator, authorize the requested data interaction associated with the first user.

9. A method for performing data interactions, comprising:
receiving a user credential associated with a first user, wherein the user credential provides the first user access to a virtual environment;
authorizing, based on the user credential, an avatar of the first user to enter the virtual environment;
monitoring a plurality of data interactions associated with the first user that are performed in the virtual environment;
recording, based on the plurality of data interactions, information relating to a set of parameters, wherein the set of parameters corresponds to a first user profile of a plurality of user profiles associated with the first user, wherein each parameter of the set of parameters defines a characteristic of the first user related to the first user profile;
determining, based on the recorded information relating to the set of parameters, a first confidence indicator for the first user relating to the first user profile associated with the first user;
receiving a request from a second user for the first confidence indicator of the first user that relates to the first user profile associated with the first user, wherein the second user is registered to receive confidence indicators from a first set of user profiles associated with a virtual organization and the first user profile is part of the first set of user profiles;

in response to receiving the request from the second user for the first confidence indicator, determining whether the first user profile associated with the first confidence indicator is included in the first set of user profiles associated with the virtual organization;

obtaining the first confidence indicator of the first user that is associated with the first user profile in response to determining that the first user profile associated with the first confidence indicator is included in the first set of user profiles; and transmitting the obtained first confidence indicator to a user device of the second user for presenting to the second user in the virtual environment.

10. The method of claim 9, wherein:
the plurality of data interactions associated with the first user comprises a data interaction performed by the first user with a third user in the virtual environment;
the set of parameters comprises a second confidence indicator of the third user;
the first confidence indicator and the second confidence indicator are numerical values;
updating the first confidence indicator of the first user comprises:
  decreasing the first confidence indicator by a first amount when the second confidence indicator of the third user is below a threshold; and
  increasing the first confidence indicator by a second amount when the second confidence indicator of the third user equals or exceeds the threshold.

11. The method of claim 9, further comprising:
receiving a request from the first user to generate a custom user profile based on a selected set of parameters;
recording, based on the plurality of data interactions, information relating to the selected set of parameters;
determining, based on the recorded information relating to the selected set of parameters, a custom confidence indicator for the first user; and
assigning the custom confidence indicator to the custom user profile.

12. The method of claim 9, further comprising:
recording, based on the plurality of data interactions, information relating to a default set of parameters; and
determining a second confidence indicator for the first user based on the recorded information relating to the default set of parameters.

13. The method of claim 12, wherein the default set of parameters corresponds to a default user profile of the first user.

14. The method of claim 9, wherein determining the first confidence indicator for the first user relating to the first user profile comprises adjusting the first confidence indicator based on the recorded information relating to the first set of parameters.

15. A non-transitory computer-readable medium storing instructions that when executed by a processor cause the processor to:
receive a user credential associated with a first user, wherein the user credential provides the first user access to a virtual environment;
authorize, based on the user credential, an avatar of the first user to enter the virtual environment;
monitor a plurality of data interactions associated with the first user that are performed in the virtual environment;
record, based on the plurality of data interactions, information relating to a set of parameters, wherein the set of parameters corresponds to a first user profile of a plurality of user profiles associated with the first user, wherein each parameter of the set of parameters defines a characteristic of the first user related to the first user profile;
determine, based on the recorded information relating to the set of parameters, a first confidence indicator for the first user relating to the first user profile associated with the first user;
receive a request from a second user for the first confidence indicator of the first user that relates to the first user profile associated with the first user, wherein the second user is registered to receive confidence indicators from a first set of user profiles associated with a virtual organization and the first user profile is part of the first set of user profiles;
in response to receiving the request from the second user for the first confidence indicator, determine whether the first user profile associated with the first confidence indicator is included in the first set of user profiles associated with the virtual organization;
obtain the first confidence indicator of the first user that is associated with the first user profile in response to determining that the first user profile associated with the first confidence indicator is included in the first set of user profiles; and
transmit the obtained first confidence indicator to a user device of the second user for presenting to the second user in the virtual environment.

16. The non-transitory computer-readable medium of claim 15, wherein:
the plurality of data interactions associated with the first user comprises a data interaction performed by the first user with a third user in the virtual environment;
the set of parameters comprises a second confidence indicator of the third user;
the first confidence indicator and the second confidence indicator are numerical values;
updating the first confidence indicator of the first user comprises:
  decreasing the first confidence indicator by a first amount when the second confidence indicator of the third user is below a threshold; and
  increasing the first confidence indicator by a second amount when the second confidence indicator of the third user equals or exceeds the threshold.

17. The non-transitory computer-readable medium of claim 15, wherein the instructions further cause the processor to:
receive a request from the first user to generate a custom user profile based on a selected set of parameters;
record, based on the plurality of data interactions, information relating to the selected set of parameters;
determine, based on the recorded information relating to the selected set of parameters, a custom confidence indicator for the first user; and
assign the custom confidence indicator to the custom user profile.

18. The non-transitory computer-readable medium of claim 15, wherein the instructions further cause the processor to:
record, based on the plurality of data interactions, information relating to a default set of parameters; and
determine a second confidence indicator for the first user based on the recorded information relating to the default set of parameters.

19. The non-transitory computer-readable medium of claim 18, wherein the default set of parameters corresponds to a default user profile of the first user.

20. The non-transitory computer-readable medium of claim 15, wherein determining the first confidence indicator for the first user relating to the first user profile comprises adjusting the first confidence indicator based on the recorded information relating to the first set of parameters.

\* \* \* \* \*